March 15, 1966 R. F. CASEY 3,240,965
ELECTROMAGNETIC MOTOR FOR A DATA INDICATOR
Original Filed Jan. 8, 1960 2 Sheets-Sheet 1
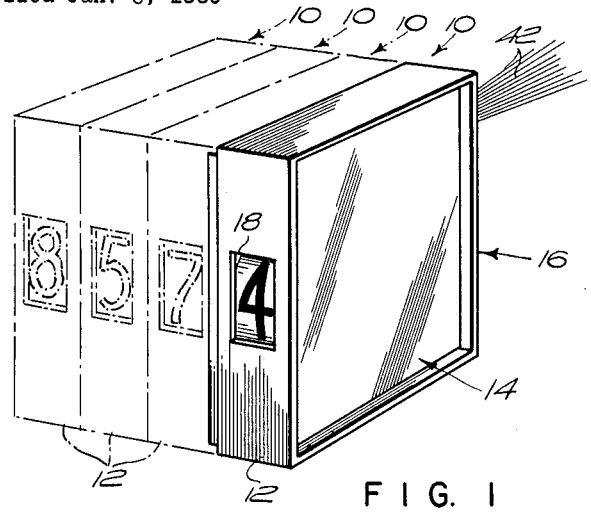
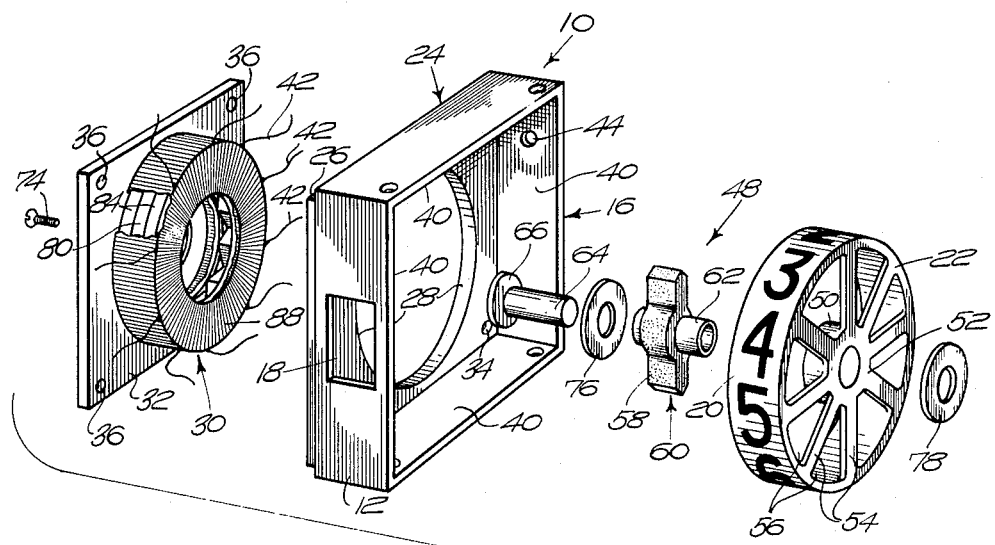
INVENTOR.
ROBERT F. CASEY
BY
Joseph Weingarten
ATTORNEY March 15, 1966     R. F. CASEY     3,240,965
ELECTROMAGNETIC MOTOR FOR A DATA INDICATOR
Original Filed Jan. 8, 1960     2 Sheets-Sheet 2
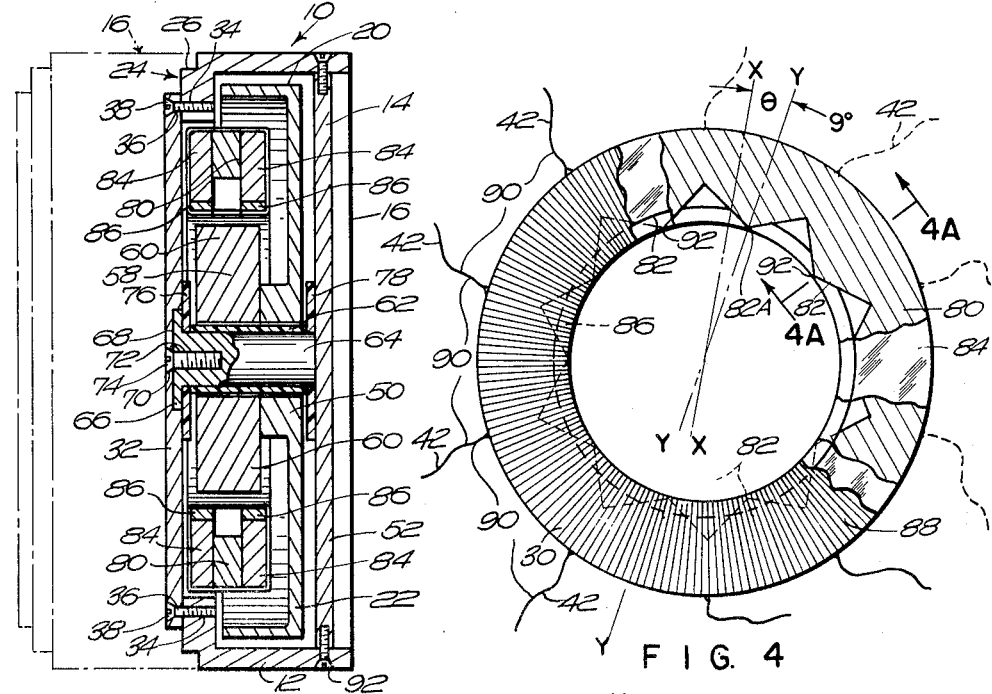
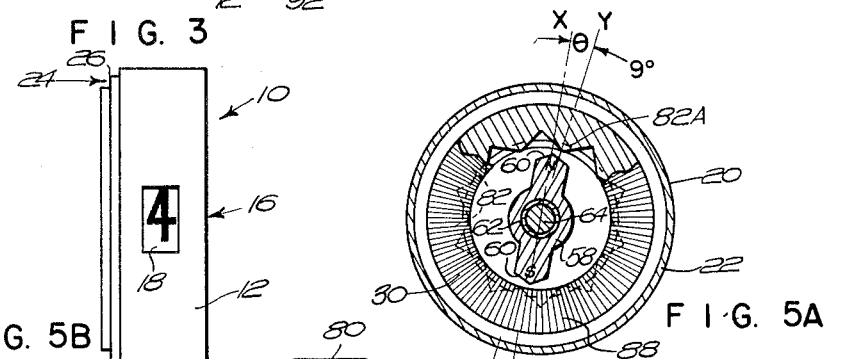
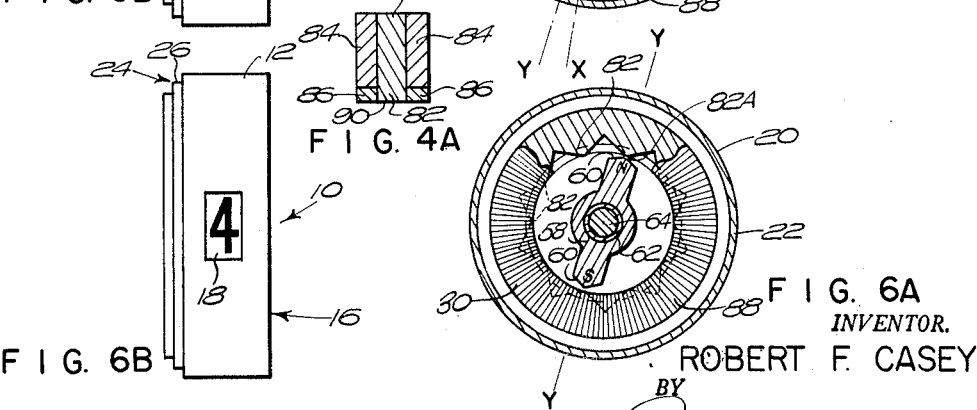
INVENTOR.
ROBERT F. CASEY
BY
Joseph Weingarten
ATTORNEY

United States Patent Office 3,240,965
Patented Mar. 15, 1966

3,240,965
ELECTROMAGNETIC MOTOR FOR A DATA
INDICATOR
Robert F. Casey, West Acton, Mass., assignor, by mesne
assignments, to The Patent Button Company, Waterbury, Conn., a corporation of Connecticut
Continuation of application Ser. No. 1,320, Jan. 8, 1960.
This application July 7, 1964, Ser. No. 382,689
2 Claims. (Cl. 310—49)

This application is a continuation of my copending application Serial No. 1,320, filed January 8, 1960, now abandoned.

The present invention generally concerns an electromagnetic data display system, and more particularly relates to an extremely compact, simple and easily fabricated apparatus responsive to external electrical excitation for reliably indicating any one of a plurality of preselected characters or indicia.

There are innumerable electronic systems such as computers and related devices which deal in electrical signals characteristics of numerical data. Eventually, however, these signals must generally be translated into some human readable form such as a data display.

Various mechanical, electromagnetic and electronic devices are presently available to provide display of data. Recent innovations in glow tube discharge indicators have established these devices in the field of data display, although a variety of disadvantages foreclose their utilization in many applications.

While effective in darkened surroundings and operable at a high speed, they are subject to disadvantages such as inflexibility with respect to character selection as well as the poor reliability and the high failure expectancy of gas discharge tubes. A variety of multiposition stepping relays are currently available but are unsuited to many applications because of their relative cost, noise, slow operation and mechanical complexity; moreover, their weight precludes use in airborne systems.

Electromagnetic indicators, such as the present invention, have advantages over either of the strictly mechanical or strictly electronic devices noted above which have caused them to be widely accepted in numerous applications requiring data display. Generically, the electromagnetic indicator device is relatively simple, rugged, silent, and fast. However, heretofore these devices have been less compact, more expensive, and more difficult to manufacture then was considered desirable.

An object of the present invention, accordingly, is to provide an electromagnetic data display device of simplified design and construction which is both considerably more compact and light in weight than any such device hitherto, as well as providing the unambiguous high speed character selection and presentation expected from this type of mechanism. The construction of the present invention which leads to its unique compactness and light weight at the same time lends itself to simple, low tolerance and, therefore, low cost mass production techniques, yielding a smaller, lighter, less expensive, and more reliable indicator than its predecessors.

Basically, the present invention employs a character bearing member in association with an electromagnetic structure which is selectively energizable to produce any one of a plurality of discrete electromagnetic field orientations. The displacement of the character member is controlled by a magnetic device the motion of which is governed by the selected field. A viewing window is provided for visual observation of the chosen character.

For each inscribed figure on the character bearing member, there are two closely adjacent magnetically determined stable positions for the character bearing member. One position is fixed by the electromagnetic structure when electrical excitation is being applied thereto. The other position is fixed by means which, while integral with the electromagnetic structure, coacts with the magnetic device associated with the character bearing member in the absence of electrical excitation. Having two positions of equilibrium, one electromagnetically defined, the other magnetically defined, allows for precise, unambiguous centering of each of the characters to be displayed. It further provides a restraining torque which precludes drift of the character bearing member due to environmental disturbances such as vibration. Moreover, it yields an electromagnetic circuit without dead spots or conditions of equilibrium which would otherwise tend to prevent the development of displacement forces upon the character member, irrespective of the applied excitation and, a feature which in some application is extremely important is that with power removed from the electromagnetic structure, the co-action of the magnetic structure keeps the character bearing member fixed in its last electromagnetically defined position.

More specifically, in one aspect of the present invention, the data indicating device comprises a substantially ring-shaped toroidal stator, having a core formed of plurality of laminations, the center lamination characterized by a series of adjacent tooth-like projections or prominences at the interior of the ring. A uniformly tapped, toroidal winding around the entire laminated stator establishes a circular configuration of symmetrically distributed windings capable of establishing a discrete number of magnetic field orientations disposed somewhat eccentrically from a reference line drawn between the center of the ring and each of the inward pointing teeth. The characters to be displayed are inscribed upon the outer cylindrical surface of a very light weight, low inertia rotor which is activated by an attached salient pole magnet the axis of which is the center of the stator ring and whose angular orientation is controlled by the electromagnetic fields of the stator windings. In other words, the tooth-like projections of the center element of the laminated stator provide a symmetrical, circular array of static, magnetizable focii or points which provide by mutual magnetic attraction with the rotor magnet a number of discrete orientations for the rotor magnet equal to the number available from the distributed windings on the stator but slightly displaced therefrom. Thus, when the appropriate current is applied to a diametrically opposite pair of connections to the windings, the rotor magnet immediately assumes the angular orientation of the electromagnetic field thus established. This field is substantially independent of the presence of the static magnetizable teeth because the toothed element of the stator is formed from a permeable material which is saturated by the electromagnetic field. Upon the interruption of this current, however, the attractive force between the respective slightly displaced teeth of the stator core and the rotor magnet controls. The rotor is accordingly displaced angularly and is locked into a new position in proximity with the projecting tooth point most nearly adjacent the vector corresponding to its immediately prior electromagnetic position. By properly positioning the toothed lamination of the stator, it is possible to fix with a corresponding degree of precision the display position of each of the characters to be viewed through the window provided.

As will become apparent as the discussion proceeds, numerous unique mechanical concepts are combined with the objectives of achieving manufacturing simplicity and cost reduction while enhancing flexibility and utility, and at the same time permitting effective operation in a more compact unit than has otherwise been considered possible. Thus, the central element of the stator may be laminated from a single, magnetically permeable toothed ring which may be fabricated by simple stamping, with plain ring-shaped elements on each side which may be similarly fabricated.

The material chosen for the toothed core of the stator is one which is readily magnetizable, that is, a material having a fair measure of permeability. The effect of using a readily permeable material is to enhance the effectiveness of any individual tooth adjacent the salient pole magnet in becoming an opposite, attracting pole. But, furthermore, the corrollary of good magnetic permeability is necessarily easy magnetic saturation. During rotation caused by electromagnetic forces, the permeable core lamination saturates, and consequently, does not drag the rotor. The central element having the inwardly pointing teeth thus provides the necessary fixed reference magnetizable detent points required after energization of the electromagnetic structure is terminated. No other complex, high tolerance elements necessitating precision assembly techniques are required for detenting. Moreover, the stator structure has a straightforward toroidal type uniformly tapped winding thereby eliminating the need for individual electromagnetic coils wound on distinct bobbins, which both simplifies the manufacture and improves overall operation.

The stator assembly is, in turn, mounted in a housing arranged so that a number of like indicator units may be joined together in an integral, compact package allowing numbers, letters, or codes of any order of magnitude to be displayed.

Other objects and features of the invention will thus be understood from the following detailed description when read in conjunction with the accompanying drawings in which:

FIG. 1 is a perspective view of an enclosed indicator unit connected to adjacent units shown in phantom.

FIG. 2 is an exploded view showing the various parts of the indicator assembly.

FIG. 3 is a cross section of the assembled indicator.

FIG. 4 is a view, part of which is cut away, of the stator winding of the indicator.

FIG. 4A is a cross section taken on the line 4A—4A of FIG. 4.

FIG. 5A shows the position of the salient pole magnet when influenced by an electromagnetic field.

FIG. 5B is a view showing the position of the numeral when the salient pole rotor is under the influence of the electromagnetic field.

FIG. 6A illustrates the position of the salient pole magnet when the energizing current is removed.

FIG. 6B indicates the position of a numeral corresponding to the position of the magnet shown in FIG. 6A.

FIG. 7 is a view, partly cut away, of a variation of the stator construction.

FIG. 7A is a cross section taken on the line 7A—7A of FIG. 7.

As illustrated in FIG. 1 a group of identical indicator units 10 each of which embodies the principles of this invention are arranged in a mechanical grouping. As will become more apparent from the description which follows, any selected indicia may be displayed by the respective units 10 as a function of applied electrical excitation. The indicia chosen will be a function of the particular application. For example, if each indicator unit 10 is capable of displaying all ten decimal digits, the apparatus shown in FIG. 1 may be used to furnish a visual output for an electronic counter. However, the display need not be digital in character, any or all of the units 10 may be employed to display alphabetic or special symbols associated with the apparatus into which the indicators are incorporated. In this description of an electromagnetic indicating device, the digital presentation is emphasized. It will be understood, however, that by relatively simple design changes, the principles of this invention may be extended to indicators capable of displaying greater or fewer digital letters or symbols.

FIG. 2 is an exploded view which generally illustrates the external physical characteristics of each of the separate elements comprising the invention, and FIG. 3 indicates the assembled inter-relationship of the various elements. Referring to both FIGS. 2 and 3, it will be seen that the electrical and mechanical elements of the device 10 are completely enclosed within a housing 12 having a detachable side plate 14 which is recessed on one side 16 of the housing. The housing 12 is formed with a window opening 18 through which the digits inscribed upon the outer cylindrical surface 20 of a rotor 22 may be viewed.

The housing element 12 has on the other side 24 thereof a ridge 26 near the outer edges of that side, the ridge having an outside dimension slightly less than the inner dimension of the housing on the side 16 having the recessed plate 14. Side 24 thus provides a rectangular edge or ridge 26 which will mate exactly with the inside dimension of the recessed side 16 of another, adjacent, indicator 10. This can be readily observed in FIG. 3 where the recessed side 16 of a unit 10 shown in phantom fits the ridge 26 formed on the other side 24 of an identical unit 10. In this manner the array shown in FIG. 1, or any larger or smaller group of devices, may be built up as a rigid integrated structure.

The side 24 of the housing 12 having the ridge 26 also has a circular opening 28 as can be observed in FIG. 2. Fitting into this circular opening 28 is a toroidal coil unit 30 attached to a housing plate 32. Holes 34 in the ridge portion 26 of the housing unit 12 at four spaced positions correspond to mounting holes 36 in the housing plate 32 and permit attaching the plate to the housing unit by screws 38.

Attaching the plate 32 to the housing 12 thereby positions the toroidal stator element 30 substantially equidistant from the four inside faces 40 of the housing unit 12. The various wires 42 connecting to the toroid unit 30 are brought outside the housing 12 through a small aperture 44 in the side of the housing opposite the side having the window opening 18.

The rotor assembly designated generally by the numeral 48, can best be seen in the illustrations of FIGS. 2 and 3. A central hub 50 on rotor 22 diverges into an integral, substantially circular side wall 52 which, in turn, supports the thin, integral character bearing cylindrical surface 20. The side wall 52 is essentially formed by a plurality of spokes 54 with spaces 56 therebetween to minimize the inertia of the rotor 22 and, as a consequence, enhance the speed of response to external signals.

The operative elements in the rotor assembly 48 is a permanent magnet 58 having ogival or similarly pointed magnetic poles indicated at 60. The hub 50 is adapted to fit against the magnet 58 to form an integral assembly whereby the two rotate as a single unit.

The magnet 58 is press fitted to a hollow cylindrical sleeve element 62 which also carries hub 50 of the rotor 22, the sleeve being rotatably concentric with a mounting shaft 64. One end of the shaft 64 has a flange 66 which seats and fits a depression 68 in the housing plate 32. An aperture 70 in the plate 32 carrying the toroidal stator 30 aligns with a corresponding aperture 72 in the flange 66 so that a screw 74 can secure the shaft to the plate. A simple washer 76 is carried by the shaft 64 between sleeve 62 and the flange 68. The other end of shaft 64 fits a washer 78 which abuts the recessed side plate 14 in the assembled unit.

The toroidal stator 30 is symmetrically and coaxially disposed within the housing 12 and the manner in which this component of the indicator 10 is constructed is best seen by reference to FIGS. 3, 4, and 4A. The core 79 of the stator 30 is a laminated toroid formed of five separate segments. The distinctive segment is essentially a flat ring 80 having a circular configuration at its outer periphery. The inside of this ring 80 is formed into ten adjacent teeth 82 symmetrically disposed around the interior of the ring. The function of these tooth-like projections 82 will be described below. This ring 80 may be economically stamped or otherwise fabricated from any material having good magnetic permeability, such as ordinary magnetic iron.

As will be seen from FIGS. 4 and 4A, the toothed ring 80 is sandwiched between two identical rings 84 also made of soft iron which have the same outer diameter as the toothed ring, the inner diameter of each of the iron rings being somewhat greater than the imaginary circle which would be tangent to the points of all the teeth 82. Thus, two identical aluminum rings 86 each having an outside diameter equal to the inside diameter of the iron rings 84, and an inside diameter equal to the diameter of the aforementioned imaginary circle will fit flat against the toothed ring 80 within the iron rings.

These five segments, the toothed ring 80, the two iron rings 84, and two aluminum rings 86, when assembled, appear as a thick flat ring forming the core 79 of stator 30 around which may be wound an electrical coil 88. Since the aluminum rings 86 are non-magnetic, the teeth 82 of ring 80 are exposed, providing magnetizable, projecting prominences for co-action with the rotor magnet 58 when the electromagnetic structure is de-energized.

The coil 88 has ten connecting leads 42 tapped off symmetrically around 360° of the coil forming a plurality of substantially uniformly spaced windings 90. Diametrically opposed leads 42 produce a plurality of electromagnetic fields having vectors which correspond to each of the ten inward pointing teeth 82 but which are displaced by a few degrees from each tooth point 92. In this ten character device 10, the displacement of the electromagnetic vector is approximately 9° from the point 90 of each tooth 82.

Assembly of the unit 10 is readily accomplished. The toroid coil structure 30 is mounted on the inside face of the housing plate 32 and aligned coaxially with the shaft mounting aperture 70. The plate 32 may then be secured to the housing 12 by the mounting screws 38 and the various leads 42 to the winding 88 are brought outside of the housing through the hole 44.

Washer 76, the cylindrical sleeve 62 carrying the magnet 58 and the rotor 20, and washer 78, can all be slipped onto the shaft 64. The screw 74 secures one end 66 of shaft 64 to plate 32 and the other end is secured by abutting the recessed plate 14 after the plate is put in place by screws 92 passing through holes in the housing 12. Once assembled, the sleeve 62 carrying the magnet 58 and rotor 20 can rotate freely around shaft 64 between washers 76 and 78.

Referring now to FIG. 4, FIGS. 5A and 5B, and 6A and 6B, the operation of the indicator will be discussed. With the device 10 assembled and in operating condition, a pair of leads 42 on the winding 88 of stator 30 will be energized to cause an electromagnetic field which may be represented by vector X—X. Energizing any particular pair of diametrically opposed leads 42 will cause an electromagnetic field which is one of ten possible selectively available discrete fields. The vector line designated X—X indicates one possible electromagnetic field orientation when a particular diametrically opposed pair of connections 42 are energized.

As will be explained later, the tapped windings 88 which correspond to each of the teeth 82 of the central laminate piece 80 need not be precisely oriented either in respect to one another or in respect to the corresponding tooth.

The salient pole magnet 58 will rapidly rotate and align itself with the field vector X—X, the sharply defined N and S poles 60 of the magnet falling along the line X—X. The toothed element 80 of the core 79 is sufficiently permeable that the energization of the electromagnetic structure 88 causes magnetic saturation of the element. As the magnet 58 swings by the various points 90 of teeth 82, the interaction between the magnet and the teeth is marginal and insignificant compared with the influence of the electromagnetic fields generated.

If the selected character is the digit (4), it will be seen in FIG. 5B that digit (4) as it appears in the viewing window 18 is off-centered by a small amount. Now, if the current energizing a particular lead 42 is cut off, the magnetic field designated by vector X—X disappears. But, as can be seen from FIG. 5A, the salient poles 60 of magnet 58 are displaced only a few degrees (9° in this embodiment) from one of the projecting teeth 82A, the teeth 82, as described previously, are fashioned from an iron material having a fair degree of magnetic permeability. The attraction between the salient poles 60 of the magnet 58 and the adjacent projecting tooth 82A will cause the magnet and its attached rotor 20 to rotate through the angle $\theta$ to an equilibrium position aligned with the vector Y—Y as indicated in FIG. 6A. This displacement will bring the digit (4) into the symmetrical centered position within the viewing window 18 as shown in FIG. 6B.

Summarizing, for each of the ten discrete orientations of the magnetic field vector X—X, there exists a fixed stable angular position for the magnet 58. In addition in the region of each of these ten discrete orientations, there exists a second stable position for the magnet 58 which is defined as shown in FIGS. 5 and 6 by the vector Y—Y. In other words, when power is applied to a particular pair of diametrically opposed leads 42, the rotor assembly 48 comprising the salient pole magnet 58 and the character bearing member 22 is brought to a first stable position where it remains until power is cut off. Immediately thereafter, the rotor magnet 58 is pulled through the slight angle by magnetic forces to the second stable position.

There are a number of particular advantages of this arrangement of electromagnetic fields displaced slightly from magnetic positions which are determined by the pointed teeth 82 of the stator core and the rotating salient pole magnet 58. If, for example, the angular orientation shown in FIG. 6A was the rest position for viewing digit (4), reversal of the field vector X—X would, in fact, develop little or no rotational torque on the magnet 58, other than that which might be generated due to inherent imperfections and inaccuracies in manufacturing the device. Effectively, for a situation which demanded a 180° reversal of the rotor 22, a condition of unbalanced or unstable equilibrium would exist which would result in either no motion whatsoever or exceedingly slow initial rotation due to the negligible torque resulting from anticipated slight machining and alignment errors. FIGS. 5A and 6A demonstrate that the application of power to a particular pair of leads 42 effects an approximate alignment so that immediately after power cut-off a definite displacement from the original aligning field is accomplished in reaching the desired position in which the digit selected in properly centered in the viewing window. Later, this displacement will permit the development of a significant rotational torque even if a digit displaced 180° from the digit under observation is selected by some external source.

Precise angular separation of the ten leads 42 forming the distributed windings 90 on the stator winding 88 would be difficult and, undoubtedly, an expensive undertaking. If alignment of each of the digits to be viewed in the viewing window 18 was to depend upon establishing ten magnetic field vectors each precisely 36° apart, a considerable degree of care in the winding of the coil toroid 88, and the take off of leads 42 would be required. As shown in the drawings, however, the stator winding 88 functions primarily to position the rotor assembly 48 close to the rest position, while the exact determination of the position of digits in the viewing window 18 is made by the ends or points 92 of the ten teeth 82 in the interior space enclosed by the stator 30. Obviously, it is a simple and inexpensive task to fabricate this magnetic element 80 whereby the teeth 82 are disposed precisely 36° apart, which in turn precisely centers each of the ten digits to be observed within the viewing window 18.

It may be noted at this time that the magnetizable teeth or points 82 will perform yet another vital function; namely, that of providing a restraining torque which tends to keep the rotor magnet 58 in the selected position notwithstanding vibration, shock or other environmental interference. It is also significant to note that because the magnetizable points 82 are physically integral with the toroidal stator 79, the poles 60 of the magnet 58 are minimally separated both from the tooth 82 determining a static magnetic position and the flux lines which determine the electromagnetic orientation of the rotor assembly 48. Thus, a fair amount of torque would be required to displace magnet 58 from the position shown in FIG. 6A unless power is applied to the input leads 42 of the device 10. Because the poles 60 are as closely spaced to the electromagnetically defined poles as they are to the magnetically defined points 92—the static magnetic positioning points 92 of element 80 are not interposed between the electromagnetic structure and the magnet 58—only a modest amount of power is required to reposition the magnet from its static equilibrium.

Although the preceding discussion has assumed that the power is turned off shortly after the rotor 48 arrives at the position defined by the electromagnetic field, it is possible to utilize the device 10 shown under the conditions on which the power is on throughout the display period of the character. Under such operating conditions, adjustments are made so that the characters are symmetrically disposed in the viewing window 18 durperiods of energization. The static magnetizable teeth 82 still function to create an unbalanced torque condition in the event that a selected digit falls diametrically opposite the digit previously indicated. The advantage of operating the device 10 with the power on through the period of the character display, of course, is that the residual or restraining torque is higher than that achieved under the conditions previously described in connection with FIG. 6A. On the other hand, the disadvantage is large power consumption and a dependence upon power if a particular reading were to be retained for a considerable period of time.

A variation of the laminated core 79 construction is shown in FIGS. 7 and 7A, the reference numbers corresponding to those of FIGS. 4 and 4A. Only three laminations are required, the aluminum rings 86 being eliminated. Instead of using a toothed core element 80 made from reasonably permeable iron material, a very high permeability (high $\mu$) material 80A is employed for the toothed element of the laminate 79A. Soft iron rings 84A sandwich element 80A, the inner diameter of the rings 84A being the same as the imaginary circle connecting tooth points 90A. Using extremely high permeability material for element 80A causes it to reach magnetic saturation during excitation of the electromagnetic structure more readily than using the soft iron of element 80. Furthermore, when excitation is terminated, the attractive forces between poles 60 of rotor magnet 58 adjacent prominent teeth 82B are much greater as a result of using a higher permeable material for element 80.

It should be noted, however, that fabrication of highly permeable materials requires somewhat more care in annealing and handling than dealing with soft iron. Improper annealing techniques result in a non-uniformly permeable element 80A. This could cause the rotor magnet to be displaced to a non-adjacent tooth 82B after excitation terminates rather than the adjacent tooth resulting in an unpredictable, erroneous data display.

Since other variations of this perferred embodiment of my invention will now be apparent to those skilled in the art it is not my intention to confine the invention to the precise form herein shown, but rather to limit it in terms of the appended claims.

What is claimed is:

1. In an electromagnetic indicator of the type utilizing
   a stator having electrically energizable windings mounted upon an annular core for selectively establishing a plurality of discretely oriented magnetic fields, and
   a rotor having a salient pole magnet mounted to pivot within the annular core whereby the magnet rotates into alignment with the magnetic field established by the stator,
   the improvement wherein the core of the stator comprises
   a pair of magnetically permeable annular elements, and
   a ring of magnetically permeable material concentric with and contiguous to the pair of annular elements, the ring having teeth protruding radially inwardly beyond the pair of annular elements and the relationship of the teeth to the discretely oriented magnetic fields being such that a different tooth is closest to but offset from a salient pole of the magnet for each aligned position that the magnetic assumes in response to the magnetic fields established by energization of the stator's windings.

2. In an electromagnetic indicator of the type utilizing
   a stator having electrically energizable windings mounted upon an annnular core for selectively establishing a plurality of discretely oriented magnetic fields, and
   a rotor having a salient pole magnet mounted to pivot within the annular core whereby the magnet rotates into alignment with the magnetic field establishes by the stator,
   the improvement wherein the core of the stator comprises
   a pair of magnetically permeable annular elements, and
   a ring of higher magnetic permeability disposed between and concentric with the pair of annular elements, the ring having radially inwardly protruding pointed teeth, and the relationship of the discretely oriented magnetic fields and the teeth being such that a different one of the teeth is closest to but offset from a salient pole of the magnet for each aligned position that the magnet assumes in response to the magnetic field established by energization of the stator's windings.

References Cited by the Examiner

UNITED STATES PATENTS

| | | | |
|---|---|---|---|
| 258,818 | 5/1882 | Spellier | 310—49 |
| 2,428,882 | 10/1947 | Van S. Kolff | 310—49 |
| 2,433,608 | 12/1947 | Handley | 310—49 |
| 2,627,040 | 1/1953 | Hansen | 310—49 |
| 2,659,853 | 11/1953 | Morrison | 310—49 |
| 2,806,987 | 9/1957 | Thomas | 310—49 |
| 2,837,670 | 5/1958 | Thomas | 310—49 |
| 2,943,313 | 6/1960 | Gordon | 340—378 |
| 3,042,818 | 7/1962 | Bush | 310—49 |

ORIS L. RADER, *Primary Examiner.*

MILTON O. HIRSHFIELD, *Examiner.*